John T. Slingerland's Imp'd
Machine for Setting Types.
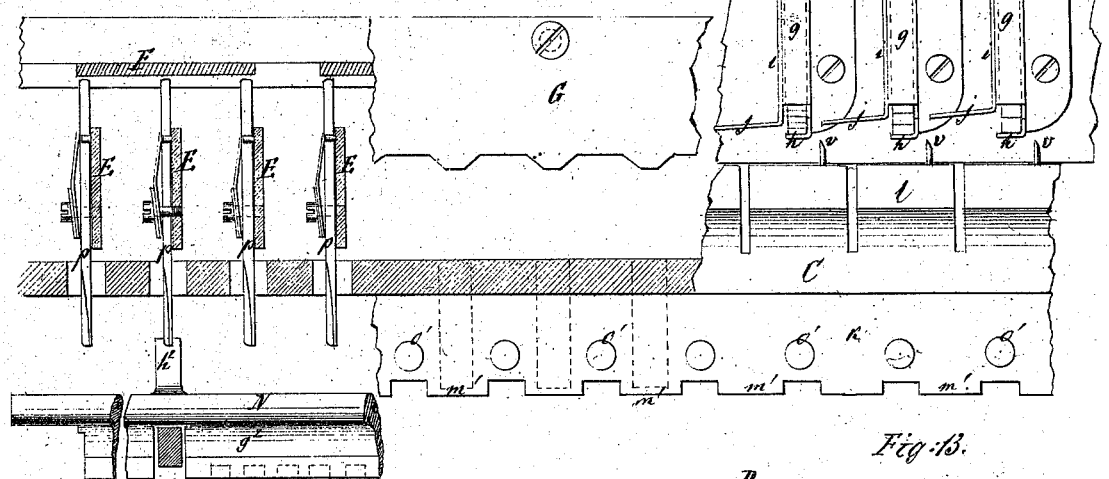
Fig. 11.
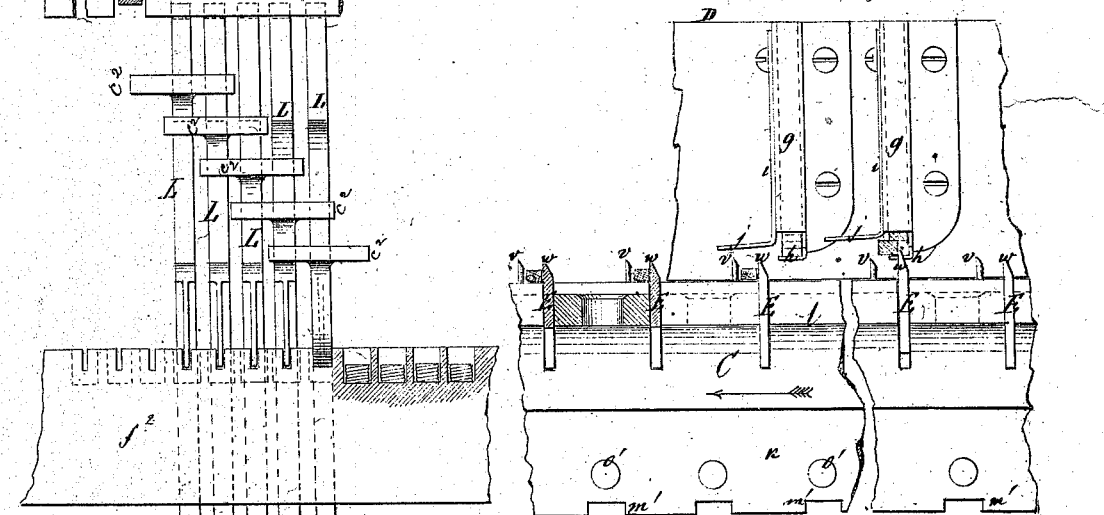
Fig. 12.
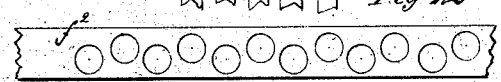
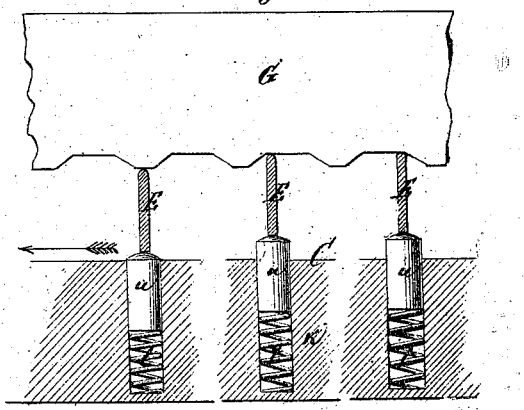
Fig. 13.
Fig. 14.
Witnesses
C. Wahlers
E. F. Kastenhuber
Inventor
John T. Slingerland
per
Van Santvoord & Hauff
attys

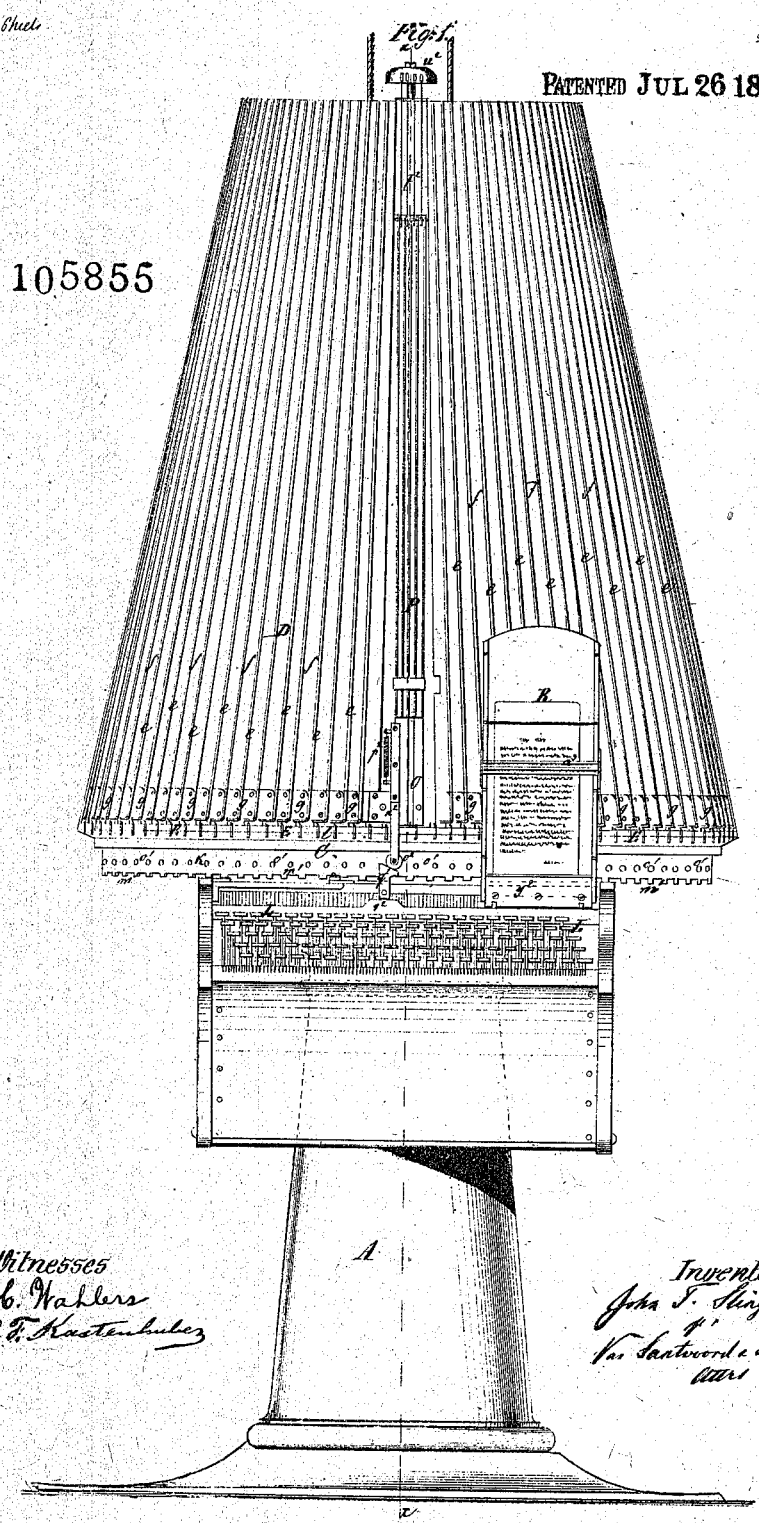

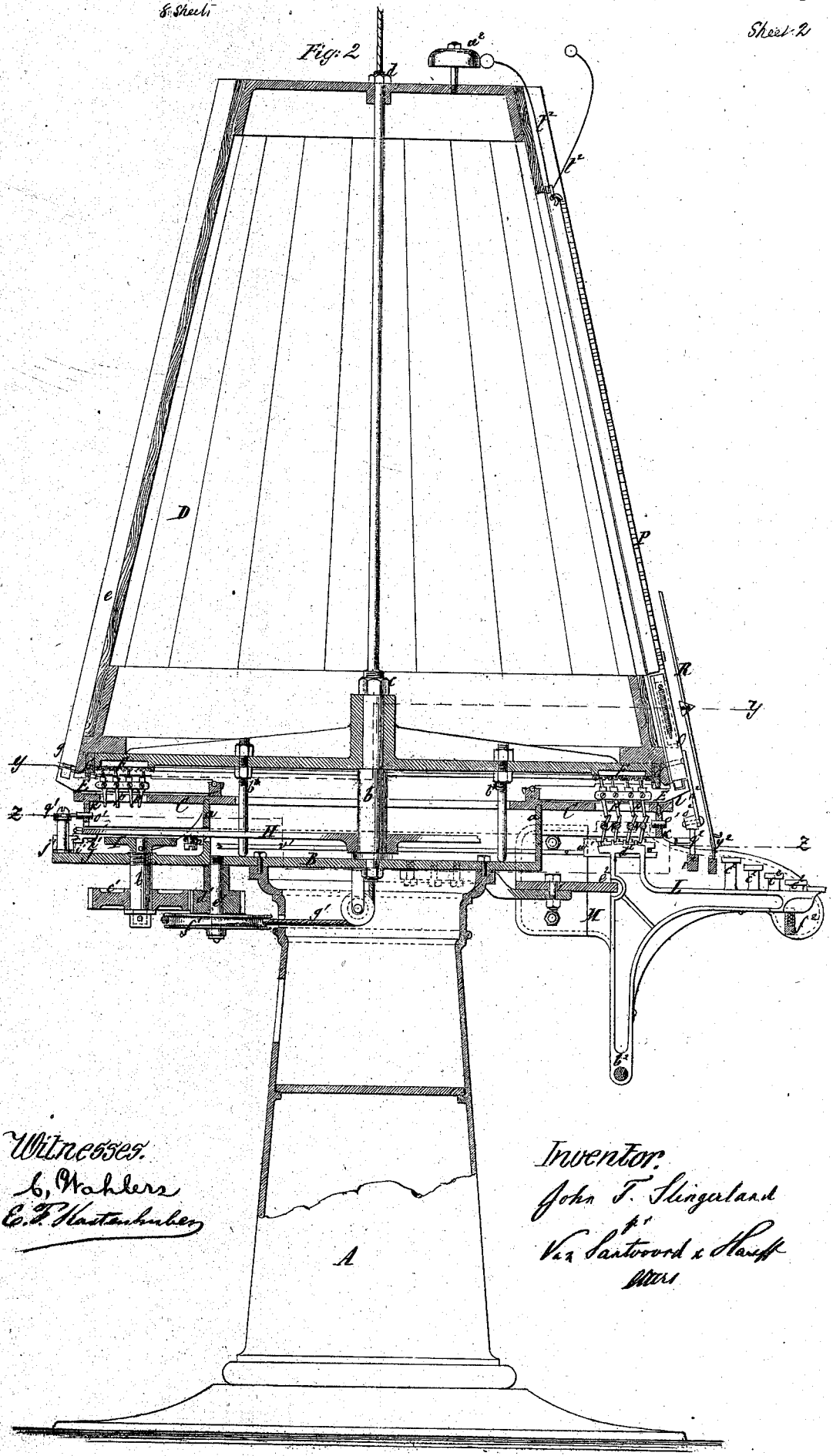

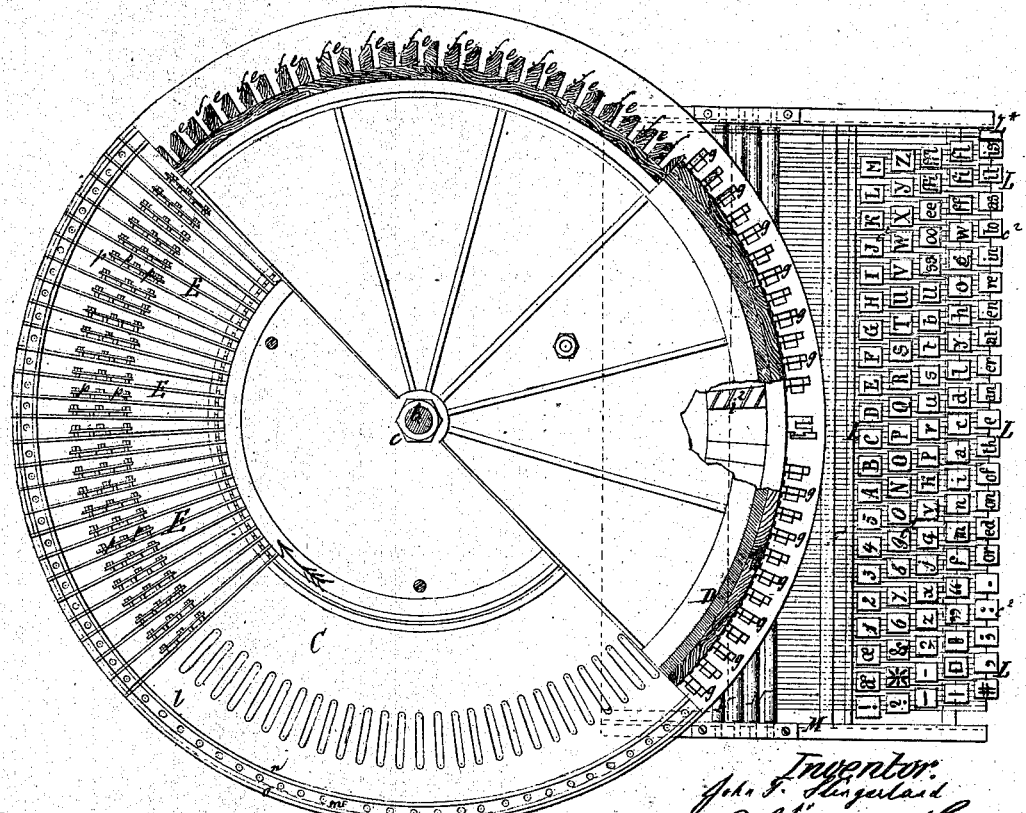
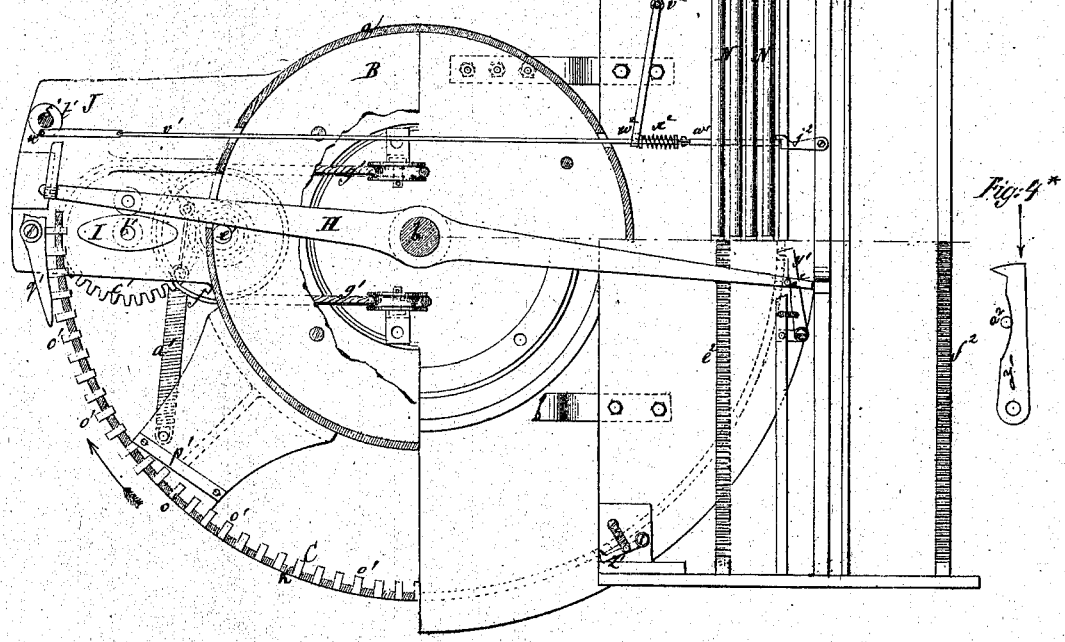

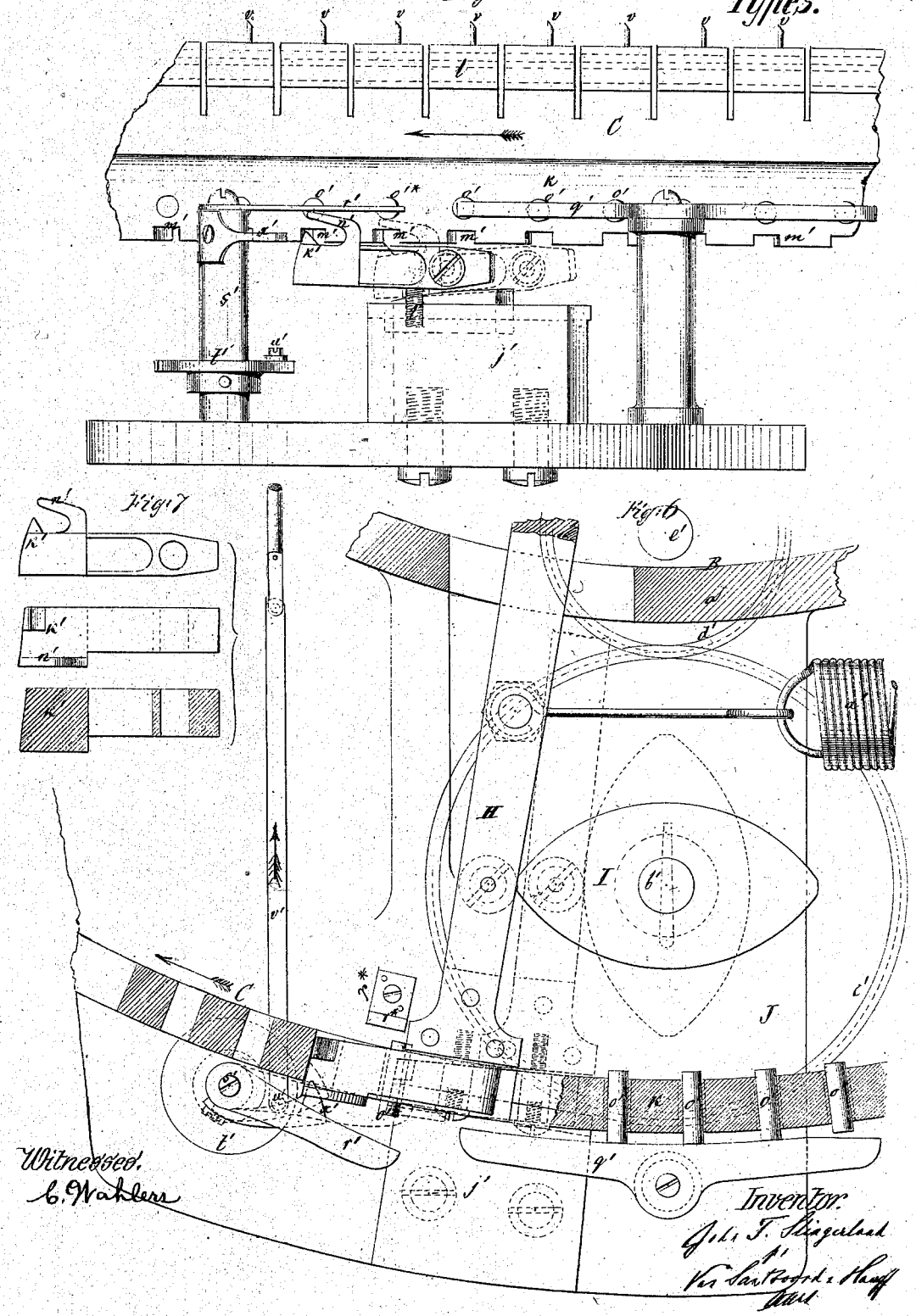

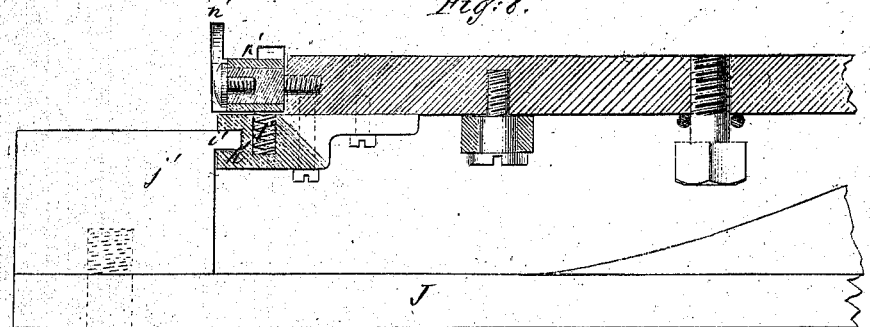
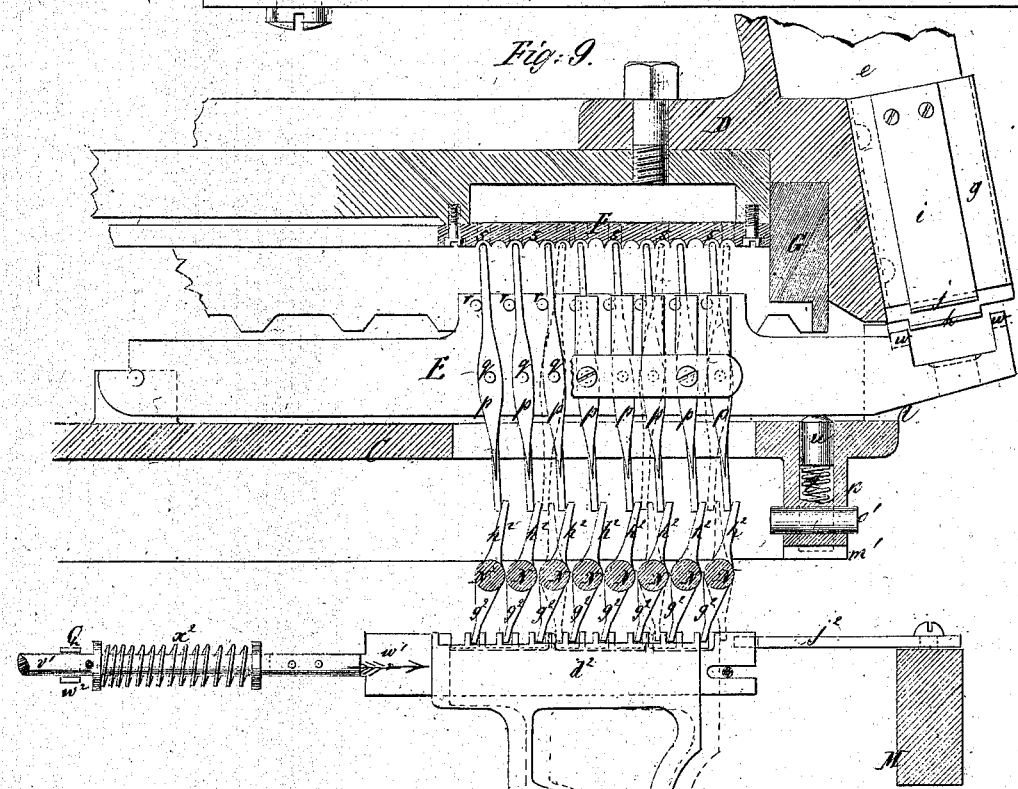
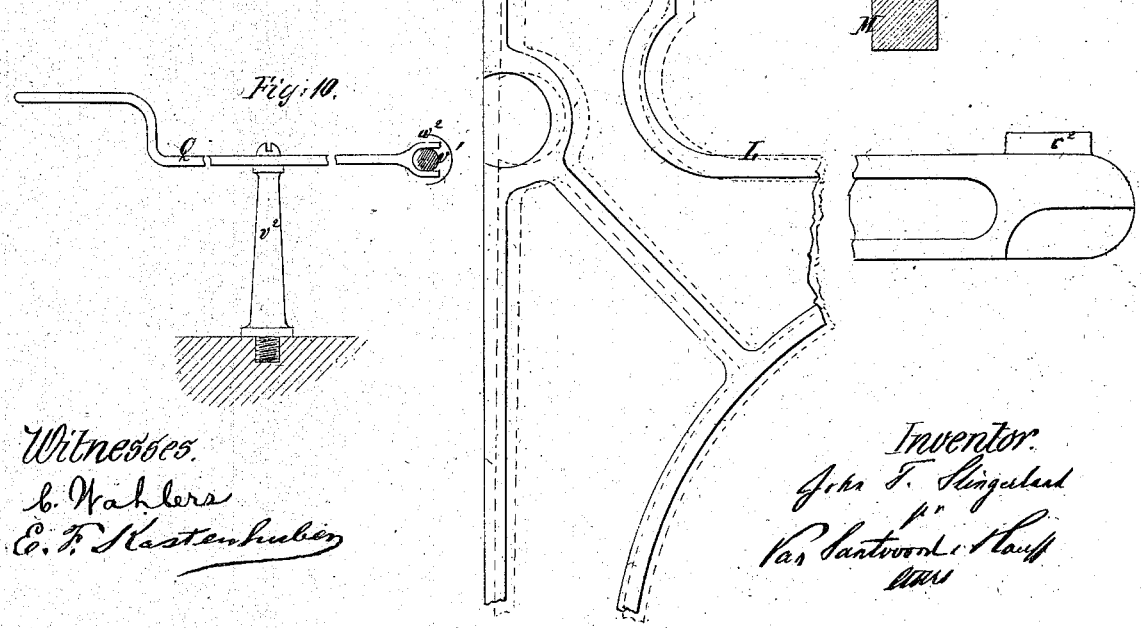

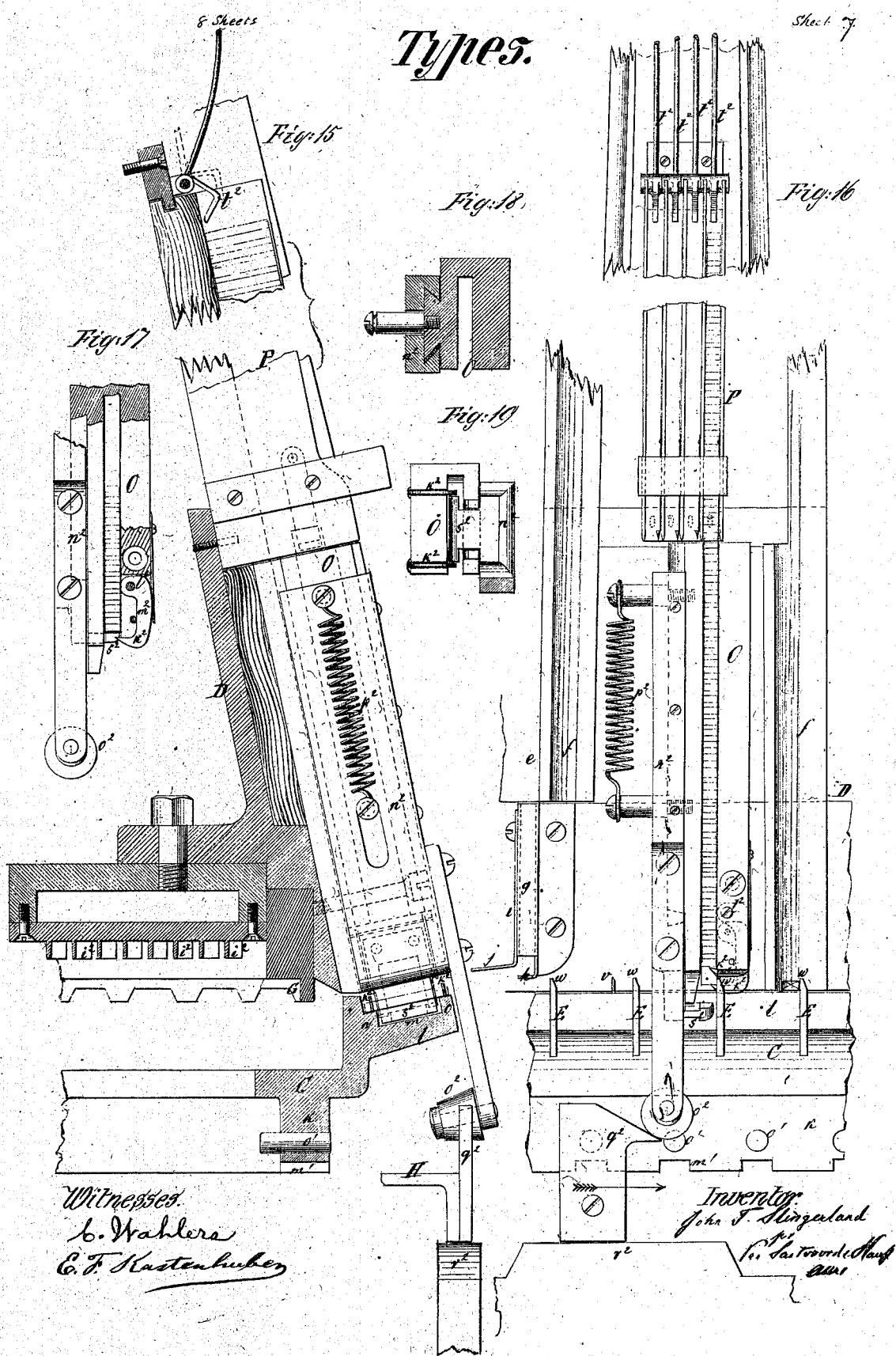

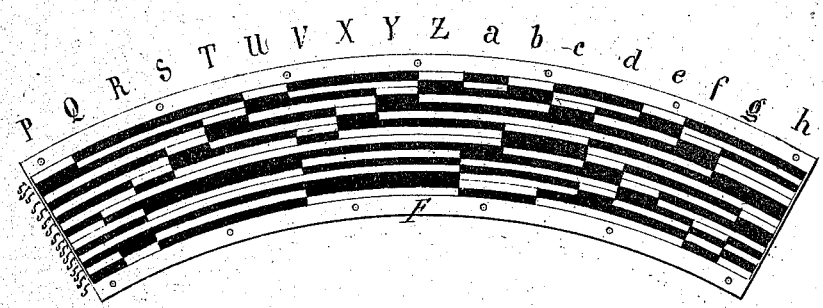

United States Patent Office.

JOHN T. SLINGERLAND, OF NEW YORK, N. Y.

Letters Patent No. 105,855, dated July 26, 1870.

IMPROVEMENT IN TYPE-SETTING MACHINES.

The Schedule referred to in these Letters Patent and making part of the same.

*To all whom it may concern:*

Be it known that I, JOHN T. SLINGERLAND, of the city, county, and State of New York, have invented a new and improved Machine for Setting Type; and I do hereby declare the following to be a full, clear, and exact description thereof, which will enable those skilled in the art to make and use the same, reference being had to the accompanying drawing forming part of this specification, in which drawing—

Figure 1 represents a front view of this invention.

Figure 2 is a vertical central section of the same, the line $x\,x$, fig. 1, indicating the plane of section.

Figure 3 is a horizontal section of the same, taken in the plane indicated by the line $y\,y$, fig. 2.

Figure 4 is a similar section of the same, the plane of section being indicated by the line $z\,z$, fig. 2.

The remaining figures are details, shown in larger scale than the previous figures, which will be referred to as the description progresses.

Similar letters indicate corresponding parts.

This invention relates to a machine for setting type, in which the types are placed into channels arranged on the periphery of a cone, and of a depth equal, or nearly so, to the length of the types, the types being placed therein in piles, face outward, and so that their flat sides bear against each other, the same as they do when the types are set up in a line for printing, with that difference that each channel contains types bearing the same character.

One side of each channel is about three-eighths of an inch lower than the other side, in order that a line of type may be inserted easily, by merely laying the line of type against the higher side, which then acts as a guide to clear the corner of the opposite side.

The bottom end of each channel is provided with a discharge-spout, having on one side one or more lips to support the pile of types in said channel, and, on its other side, a flange, which prevents the types, while being scraped out of the channels, from being thrown in a wrong position, the flanged side of the discharge-spout being made elastic and yielding, so that, in case a wrong type, of greater thickness than those for which the channel is designed, should accidentally get into one of the channels, such type can be forced out without injuring any part of the mechanism.

The mechanism employed for scraping the types out of their channels consists of a wheel, which revolves round a vertical axis, and which carries a seris of composers, the action of which is controlled by a perforated ring, and by a scalloped rim.

The composers are hinged, in a radial position, to the carrier-wheel, at their inner ends, and each of the composers is provided with a series (eight being shown in this example) of hinged levers or indicators, the upper ends of which slide in the grooves of the perforated ring, being pressed up by the action of a spring, which acts on the body of the composer. The perforated ring is constructed of flat segmental plates, fastened to the base of the cone containing the type-channels, and it is provided with twice as many grooves as there are indicators on each composer, and each of the indicators can be so adjusted that its point is made to glide in either of two adjoining grooves, and these grooves are differently perforated opposite each type-channel, so that, when the indicators of a conveyer have received a signal for a certain type, the outer end of the composer, which is provided with suitable scrapers, on arriving opposite the channel containing said type, is forced up, and the lowest type in the channel is scraped out.

The scalloped rim serves to govern the approach of the composer to the channel from which it is to take a type; also, to maintain it in position while scraping out the type; and, also, to restore the composer to its original position; and the type previously scraped out is deposited on the edge of the carrier-wheel, and carried to the receiving-channel.

The set is given to the indicators by the action of keys, which act on intermediate key-board levers; and, whenever a key is depressed, the mechanism for imparting motion to the carrier-wheel is thrown in gear, and the carrier-wheel is caused to move one step, equal to the distance between the discharge-spouts of two adjoining type-channels.

The mechanism for imparting motion to the carrier-wheel consists, chiefly, of a vibrating lever, which receives its motion by the combined motion of a cam and of a spring, and which carries a pawl, that is allowed to engage with teeth in the edge of the carrier-wheel, whenever it is free to rise, said pawl being depressed by the action of loose pins in the rim of the carrier-wheel, on a cam, hook, or stop, and not being free to rise until the loose pin, acting on the stop, is driven in by a hammer, which is actuated whenever one of the keys is depressed. This hammer is mounted on a vertical rock-shaft, on which is secured an arm, connected to the nib-slide, which engages with the key-board levers; and to the vertical rock-shaft is also attached a hook, which serves to restore the hammer, the nib-slide, and the keys to their original position, and which also prevents any of the keys being depressed until the carrier-wheel has reached the proper position. The carrier-wheel is arrested after each movement by two stop-pawls acting thereon in opposite directions, and released at the proper moment, one by the motion of the vibrating lever, the other by the carrier-wheel itself.

A suitable stop-latch serves to arrest the nib-slide, thereby preventing either of the keys being depressed. If the stop-latch is thrown back out of the way of the nib-slide the nib-slide can be drawn in by means of the starting-lever, which bears against a spring coiled round the shank of the nib-slide, so that the carrier-wheel will continue to move, step by step, without any of the keys having been depressed, for the purpose of delivering all the types previously deposited on the same, the spring on the shank of the nib-slide allowing said slide to yield to the action of the restoring-hook. The starting-lever is made to catch in a notch of the frame. Instead of this starting-lever, however, a blank key may be used, which acts on all the key-board levers, and on the nib-slide, and which may be used in preference to the starting-lever, to prevent any accidental displacement of either of the key-board levers.

The types, after having been scraped out of the type-channels, are carried round by the carrier-wheel until they arrive under the receiving-channel, which is provided with a lifter, receiving a reciprocating rising and falling motion, by the action of a cam on the front end of a vibrating lever. As the lifter rises, it catches under the type situated on the rim of the carrier-wheel, and pushes the same up into the receiving-channel, past two hooks, which fall in by the action of springs, and catch under the type so lifted, and retain it in the receiving-channel.

The bottom edges of these hooks are rounded off, so that they recede whenever a type is brought to bear against them from below.

The space above the receiving-channel is occupied by a multiple channel, or a channel having two or more compartments, each of which can be brought in line with the receiving-channel. This multiple channel is held in position by a stud projecting in its back, and, when one of its compartments is filled, an alarm-gong is sounded, and the operator moves said channel sidewise, so as to bring its next empty compartment over the receiving-channel, thereby saving the time which would be required for taking off said channel, and replacing it by another each time a single channel is filled.

The keys are constructed in the form of bell-crank levers, each of which is provided with a segment having one or more projections, to act on one or more of the key-board levers, and said keys are guided in front and rear by slotted bars. The finger-pieces of the keys are arranged in five rows, each finger-piece bearing the character for which it is intended to give a signal, and these characters are so placed that those most used are in the most convenient position for the operator.

In the drawing—

The letter A designates a column which forms the support of the working parts of my machine.

On the top of this column is secured a plate, B, provided with an annular rim, $a$, and from the center of this plate rises a pin, $b$, which, together with the adjusting-studs $b^*$, forms the support for the cone D, said pin being provided with a shoulder, against which the base of the cone is held by a nut, $c$, and also with an extension passing up through the upper surface of the cone, and furnished with a screw-thread and nut, $d$, so as to retain said cone firmly in position, (see fig. 2.) The top and base of the cone are by preference made of cast-iron, and provided with annular flanges, against which a wooden jacket is fastened, by screws or any other suitable means.

On the periphery of the cone D are formed a series of type-channels, $e$, which are separated from each other by partitions $f$, (see figs. 1 and 3,) each channel being made nearly equal in depth to the length and in width to the width of the types, so that said types can be placed therein in piles, the adjoining types bearing against each other with their flat sides, the same as they do when set up in a line for printing, with the exception, however, that each channel contains types all bearing the same character, one or more channels being provided for each character.

One side of each channel is about three-eighths of an inch lower than the other side, in order that a line of type may be inserted easily, by merely laying the line of type against the higher side, which then acts as a guide to clear the corner of the opposite or lower side. Said type-channels are open at the top, and they are provided at their bottom ends with discharge-spouts $g$, best seen in figs. 3, 9, 11, and 13. These spouts are bent up, of sheet metal, and they are secured directly to the lower portion of the cone D.

Each of the spouts is provided on one side with one or more lips, $h$, which form the support for the pile of types in the channel, and the opposite side of the spout is closed by an elastic plate, $i$, provided with a flange, $j$, extending toward and close to the next succeeding type-channel, and at an elevation above the lip or lips $h$ corresponding to the thickness of the type for which the channel is intended, so as to prevent the escape of more than one type at a time.

The object of the elastic plate $i$ is to allow the discharge of a thicker type than those intended for the channel without injury, should such a thick type happen accidentally to get into the channel.

The flange $j$ serves to prevent the types, while being scraped out of their channels, from turning or getting into a wrong position.

The rim $a$ of the top plate B of the column A forms the support and guide for the carrier-wheel C. This wheel is constructed of an annular plate, provided with a downwardly projecting rim, $k$, (see figs. 2, 4, 9, and others,) and with a rising flange, $l$, (best seen in figs. 3, 11, and 15.) The surface of this flange is made with a depression, $m$, between two raised ribs, $n\ o$, the inner one of which forms a shoulder for the types to rest against, as shown in fig. 15.

If desired, an additional rib may be made in the middle of the cavity $m$, and, if this central rib is wide enough to form a good support for the type, the outside ribs may be dispensed with. In this case the flange $l$ would be provided with two cavities and one rib.

The rising flange $l$ is provided with a series of narrow slots to receive the outer ends of the composers E, (see figs. 3, 9, 11, and others,) which radiate from the center of the carrier-wheel, being connected at their inner ends to said carrier-wheel by means of lugs and pivots, so that their outer ends are free to swing up and down.

On the side of each composer are eight (more or less) levers or indicators, $p$, which oscillate on pivots $q$, (see fig. 9,) and are subjected each to the action of a friction-plate or spring, so that they will remain in any position into which they are brought. The oscillating motion of these indicators, however, is limited by studs $r$, secured between them. Their upper ends are rounded off and made to slide in the grooves of the perforated ring F. This ring is made of a series of flat plates, (see Figure 20,) which are screwed against the bottom surface of the cone D, fig. 9, so as to form nearly a complete ring, that portion thereof in front of the receiving-channel, where the composer gets its set, being left open, and it (the ring) is provided with a series of grooves, $s$, equal in number to twice that of the indicators on each composer, each indicator being so situated that its point can be made to bear in either of two adjoining grooves. These grooves are differently perforated at certain intervals, (see fig. 20,) the perforations being so arranged that, by their combination, the various characters and letters are represented, and that the perforations corresponding to a certain character are opposite or under the discharge-spout of the channel containing the types bearing the same character.

Each of the composers is subjected to the action of a spring, $t$, which has a tendency to force the same up, a plug, $u$, being interposed, so as to produce an even and uniform action of the spring.

If the indicators of a composer are set for a certain character, for instance, the letter P, and said composer arrives under the channel containing the types bearing said letter, the indicators, on coming opposite the perforations corresponding to the letter P, will meet with no resistance, and the composer is forced upward by the action of its spring $t$, so that it comes behind the lowest type in the channel P, and scrapes the same out, each composer being provided at its outer end with one or more scrapers, $w$, (best seen in fig. 9.)

To control the motion of the composer while it rises, and prevent the same from rising any higher than desirable, and to return it to its original position after it has scraped a type out of one of the channels, a scalloped rim G is applied, (see figs. 9, 11, 14, and others,) the edge of which is so shaped that it allows said composers to fall in opposite each channel for which the set has been given, and that it forces said composers back to their original position after their work has been done, as indicated in fig. 14, where three composers are shown, one just after it has fallen in, one just before it begins to be forced back, and the last after having been forced back to its original position.

The manner in which the composers act on the types is shown in fig. 13, where one of the composers is represented in the act of scraping out a type. The scrapers of the composers straddle the lip $h$ of the discharge-spout $g$, and, as the carrier-wheel advances, the lowest type in the channel is scraped out, being held in the proper position by the lip $j$, and finally deposited upon the flange $l$ of the carrier-wheel, which is provided, in its ribs $n o$, with projecting pins $v$, whereby the types, on being deposited on said carrier-wheel, are confined in a radial position.

The carrier-wheel receives its motion by means of a lever, H, which has its fulcrum on the center-pin $b$, and which is drawn up against the periphery of a cam, I, by means of a spring, $a^1$, figs. 4 and 6, so that, as said cam revolves, an oscillating motion is imparted to the lever H.

The cam I is mounted on the upper end of a vertical spindle, $b^1$, which has its bearings in a bracket, J, secured to the top plate B of the column A, and on the bottom end of which is secured a cog-wheel, $c^1$, that gears in a pinion, $d^1$, turning loosely on a vertical spindle, $e^1$, and connected to a pulley, $f^1$, which receives a revolving motion by means of a belt, $g^1$, passing down through the hollow cone D, as shown in fig. 2.

The rear end of the lever H is provided with a groove, $h^1$, which catches over a rib, $i^1$, projecting from a fixed block, $j^1$, and to said end is pivoted a pawl, $k^1$, which is pressed up by means of a spring, $l^1$, (see figs. 5 and 8,) and, when allowed to rise, engages with teeth $m^1$ in the bottom edge of the rim $k$ of the carrier-wheel, (see fig. 5.)

The position of the pawl $k^1$, in relation to the teeth $m^1$, is governed by a stop, $n^1$, which projects from the edge of the pawl, (see fig. 7, which shows detached views of the pawl with the stop,) and, by a series of pins, $o^1$, which are placed loosely into the rim $k$ of the carrier-wheel.

The number of these pins is equal to the number of composers on the carrier-wheel, there being one pin for each composer, and, as the carrier-wheel revolves, all these pins, which have been previously pushed in, are driven out by an inclined plane, $p^1$, (see fig. 4,) and their correct position is finally insured by a shield, $q^1$, secured on the bracket J outside of the rim $k$ of the carrier-wheel, and at such a distance therefrom that the loose pins $o^1$, on passing under said shield, are so adjusted that they all project to a uniform distance beyond the periphery of the rim $k$. The shield $q^1$ is best seen in figs. 5 and 6.

If the pin $o^{1*}$, which, at a certain moment, is situated over the stop $n^1$, is left out, said stop is depressed to the position shown in dotted lines in fig. 5, the pawl $k^1$ does not engage with the teeth $m^1$ on the carrier-wheel, and the motion of the oscillating lever H is not transmitted to said carrier-wheel. But, as soon as said loose pin $o^{1*}$ is pressed in, the stop $n^1$ is released, the pawl $k^1$ is thrown in gear with the teeth $m^1$ by the action of the spring $l^1$, and the carrier-wheel is moved one stop, the pawl $k^1$ being immediately thrown out of gear with the teeth $m^1$ by the next succeeding-pin $o^1$.

The pins $o^1$ are pushed in at the required time by the action of the hammer $r^1$, which is mounted on the top of a vertical rock-shaft, $s^1$, (see figs. 5 and 6,) having its bearings in the bracket J.

On this rock-shaft is secured a disk, $t^1$, which carries an eccentric wrist-pin, $u^1$, that connects by means of a rod, $v^1$, with the nib-slide $w^1$, fig. 4. By pulling the rod $v^1$ in the direction of the arrow marked thereon in fig. 6, the rock-shaft $s^1$ is oscillated, and the hammer $r^1$ is caused to drive in that one of the loose pins $o^1$ which, at the moment, stands opposite the stop $n^1$, and, as soon as this pin is driven in, the carrier-wheel is propelled one stop. A shield, $r^*$, rising from the inside of the carrier-wheel, opposite the hammer $r^1$, prevents the loose pins being driven in any further than desirable, (see fig. 6.)

To the rock-shaft $s^1$ is also secured a restoring-hook, $x^1$, which prevents the hammer $r^1$ being actuated at the wrong time, and which also serves to restore said hammer to its original position in the following manner: said restoring-hook is situated in the same plane with the teeth $m^1$ on the rim of the carrier-wheel, so that the hammer $r^1$ can not be carried in, unless said carrier-wheel is in such a position that the restoring-hook can enter one of the spaces between the teeth $m^1$, and, as the carrier-wheel is propelled one step, the edge of the succeeding tooth $m^1$ forces out the hook $x^1$, and, consequently, the hammer $r^1$ back to its original position.

It will be seen that this restoring-hook performs a very important function, for, if the hook is taken off, and the strain on the rod $v^1$ continues, the point of the hammer would either strike against the succeeding-pin $o^1$, and the carrier-wheel would be stopped in the wrong position, or the succeeding pins would be successively forced in, and the motion of the carrier-wheel would continue beyond the desired point. But, as the hook $x^1$ is forced back by the action of the carrier-wheel itself, the strain on the rod $v^1$ is overcome, and the carrier-wheel is only moved one step at a time.

The correct position of the carrier-wheel, however, is still further insured by a stop-click $y^1$, and a check-click, $z^1$, (see fig. 4.) Both these clicks engage with the teeth $m^1$ on the rim $k$ of the carrier-wheel, the check-click $z^1$ being applied simply to prevent the carrier-wheel from rebounding, and being so arranged that it is forced out by the edge of the tooth, while the stop-click $y^1$ prevents the forward motion of the carrier-wheel at the wrong moment, and beyond the desired point.

The edge of this click is cam-shaped, as shown in fig 4*, and it is acted upon by a pin, $a^2$, secured in the oscillating lever H, so that it is thrown out of gear with the carrier-wheel before the pawl $k^1$, on the opposite side of said lever, begins to act. Both clicks, $y^1$ and $z^1$, are subjected to the action of springs, which have a tendency to keep them in gear with the carrier-wheel.

If the carrier-wheel is at rest, it is so situated in relation to the type-channels on the cone D, that the composers are opposite the partitions $f$, between said type-channels, (see fig. 11,) and, if the carrier-wheel is propelled one step, all the composers are caused to sweep past the discharge-spouts of the succeeding type-channels.

If the indicators on one of the composers have been set, so that said composer can fall in while it sweeps past the succeeding type-channel, the lowest type in said channel is scraped out and deposited on the carrier-wheel, as has been previously described.

The mechanism which actuates the hammer $r^1$, and releases the carrier-wheel, is, therefore, combined with the mechanism which gives the set to the indicators of the various composers in such a manner that the set is given to a composer just before the hammer strikes the pin $o^{16}$, so that said composer, on arriving opposite the type-channel containing the character for which it has been set, is enabled to fall in, and to scrape out the required type.

This object is obtained by the combination of the keys L with the nib-slide $w^1$, which connects, by means of the rod $v^1$ and eccentric wrist-pin $u^1$, with the hammer-shaft $s^1$, as previously stated.

The keys, best seen in figs. 2 and 9, are made in the form of bell-crank levers, which have their fulcrums on a common rod, $b^2$, and each of which is provided with a finger-piece, $c^2$, and with a segment, $d^2$, each having one or more nibs or teeth, according to the number and position of indicators to be noted on by it. Said keys are set close together in the key-board M, (see also figs. 1 and 3,) and they are guided in front and rear by notched bars $e^2 f^2$, best seen in fig. 4, those parts of the keys which engage with the notches in said bars being reduced in thickness, so that said keys can be set close together, and yet room is obtained in the bars $e^2 f^2$ for the notches, (see fig. 11.) Small springs inserted into sockets in the bar $f^2$ have a tendency to retain the keys in the positions shown in figs. 2 and 9, the sockets for these springs being bored in a zigzag position, as shown in fig. 12, so as to bring said springs as close together as required to conform to the position of the keys.

The nib segments of the keys act on the key-board levers N, which are arranged one behind the other, as seen in fig. 9, and each of which is provided with a downwardly-projecting flange, $g^2$, which extends throughout the entire length of the key-board, and with an upwardly-projecting arm, $h^2$, intended to act on the indicators of the composer, which stands directly over the center of the key-board.

The number of the key-board levers is equal to that of the indicators in each composer, and said key-board levers are so situated that each of them acts by means of its arm $h^2$ on one of the indicators, said indicators being brought back to their starting position by means of inclined planes $i^2$, (see figs. 3 and 15,) before they come opposite the arms $h^2$ of the key-board levers.

The nib segments of the keys are provided each with one or with a combination of nibs, so that some of the keys will actuate only one, and others two or more of the key-board levers, and, consequently, one or more of the indicators. By depressing a key, therefore, the composer receives a set corresponding to the character controlled by said key, and, as this composer arrives opposite the channel containing the types bearing said character, it is enabled to fall in and sweep the lowest type out of said channel, the perforations of the ring F corresponding at that point to the set of the composer.

The nib-slide $w'$, fig. 9, is provided with a number of nibs, equal to the number of key-board levers, and these nibs engage with the outer faces of the flanges $g^2$ of all the key-board levers, so that, whenever one of the keys is depressed, and an oscillating motion is imparted to one or more of the key-board levers, the nib-slide is caused to move in the direction of the arrow marked thereon in fig. 9, the nibs of the key-segments being situated inside, and those of the nib-slide outside of the flanges of the key-board levers, and thereby the hammer-shaft is caused to oscillate, and the hammer is made to drive in the pin $o^{16}$, as previously described.

But as the key is depressed, and before the hammer has driven in the pin $o^{16}$, the set is given to the composer, situated at the time over the arms $h^2$ of the key-board levers, and, as the carrier-wheel revolves, said composer is, sooner or later, brought under the channel containing the types for which it has received its set, and at that place the composer falls in and scrapes out the required type.

As the nib-slide is forced back again to its original position, by the action of the restoring-hook $x^1$, it carries back with it all the key-board levers, and the key which has been acted on is forced up, even if the pressure of the finger thereon should continue, and neither of the keys can be depressed before the carrier-wheel has completed its motion for a full step. If it was not for this precaution, and if one or more of the key-board levers should be allowed to remain in the position given to them by depressing a key, some of the indicators of the succeeding composer would strike against some of the arms of the key-board levers, and the mechanism would be deranged.

With the nib-slide $w'$ is combined a latch, $j^2$, which, when thrown in the position shown in figs. 4 and 9, serves to lock said nib-slide, and, with it, all the key-board levers, so that, when said latch is thrown in its locking position, neither of the keys can be depressed.

The types which have been swept out of the type-channels in the cone D by the action of the composers are carried round on the carrier-wheel, until they arrive under the receiving-channel O.

This channel is secured to the cone D, between the ordinary type-channels, opposite the middle of the key-board, or nearly so, as shown in figs. 1 and 2, detached views of the same being represented in figs. 15 to 19, inclusive.

By inspecting fig. 16 it will be seen that said receiving-channel is open at top and bottom, its bottom end being provided with two hooks, $k^2$, one in front and the other in the rear, said hooks being so formed, and connected to the side of the channel by pivots $l^2$, that they have a tendency to fall into the position shown in fig. 17, being subjected to the action of small springs, stops $m^2$ being provided, which prevent said hooks from falling in beyond this position.

To the opposite side of the channel is secured a slide, $n^2$, which is provided at its bottom end with a friction-roller, $o^2$, and which is subjected to the action of a spring, $p^2$, having a tendency to keep said slide down in the position which the same occupies in figs. 15 and 16.

A cam, $q^2$, which is connected to the inner end of the oscillating lever H, acts against the roller $o^2$, and raises the slide $n^2$ once for every oscillation of the lever H, the end of said lever being supported by a projection, $r^2$, on a traverse of the key-board, so that the same is not liable to be bent down by the force of the spring $p^2$, which it is compelled to overcome every time the cam $q^2$ strikes the roller $o^2$.

To the slide $n^2$ is attached a lifter, $s^2$, which, when the slide is down, drops into the cavity $m$ of the carrier-wheel, (see fig. 15,) so that, whenever said carrier-wheel revolves, the types previously deposited thereon are successively brought over the lifter $s^2$, and, as the slide $n^2$ is forced up by the cam $q^2$, one type after the other is carried up into the receiving-channel.

As the lifter rises the type supported by it strikes the rounded edges of the hooks $k^2$, and forces the same back, and, as soon as the type has passed the hooks, they (the hooks) fall back and retain the type in the channel, while the lifter descends to carry up the next succeeding type.

It will be noticed, by observing the position of the lever H in fig. 3, that the upward motion of the lifter takes place while the carrier-wheel remains stationary, and *vice versa*, so that the lifter is always down just before the motion of the carrier-wheel ceases, and does not begin to rise until the type deposited on said carrier-wheel has been brought fully over the lifter, said type being confined between the lips $w$ of the composers on one, and the pins $v$ projecting from the carrier-wheel on the opposite side. By these means the correct position of the types, in relation to the receiving-channel, is insured, and the lifter is enabled to carry each type up into said channel without fail.

The slide $n^2$ is attached to the side of the receiving-channel by means of a dovetail, as shown in fig. 18, and it is provided with a slot, through which extends a stud, to which the spring $p^2$ is attached, as shown in figs. 15 and 18.

In fig. 19 an inverted plan of the receiving-channel is represented, showing the hooks $k^2$ and the lifter $s^2$.

The receiving-channel O extends only partially up on the cone D, the space above it being left free for the multiple-channel P, which is composed of two or more compartments, each of which can be adjusted in line with the receiving-channel, said multiple-channel being held in position simply by a stud projecting from the body of the cone, and catching into holes in the base-plate of the channel. The object of this multiple-channel is to enable the operator to go on with the operation of setting for a long time without interruption, nothing being required, after one of the compartments in the multiple-channel has been filled, but to move said multiple-channel sidewise, and to adjust the next succeeding compartment in line with the receiving-channel.

Directly over the top of each compartment of the multiple-channel is pivoted a bell-crank lever, $t^2$, which carries a hammer arranged in such a position in relation to a gong, $u^2$, figs. 1 and 2, that, when the compartment fills up, the upper type therein will actuate said hammer, thereby giving a signal and calling the attention of the operator to the fact that the compartment is about being filled.

The gong $u^2$ is secured on the top of the cone D, (see figs. 1 and 2,) one and the same gong being common to all the compartments of the multiple-channel.

After all these compartments have been filled, the multiple-channel must be removed and replaced by another, and then the operation can be continued, the full channel being given to the justifier for the final justification of the matter.

The finger-pieces of the keys are arranged in five rows, as shown in figs. 1, 2, and 3, so that each finger-piece can be made sufficiently large to be conveniently touched with the finger.

Each finger-piece bears the character which its key is intended to control, and these characters are so arranged, that those most used in composing are in the most convenient position for the operator, while those which are little used are toward the upper sides of the key-board.

By referring to fig. 3, it will be noticed that provision is made for capital and small letters, also for figures, for dipthongs, and for other combination letters; also for stops or signs indicating pauses, such as a period, a comma, &c., and, in fact, for all signs which occur in printed matter; also for quadrats and for thin spaces or types bearing no character, and it is obvious that the number of keys can be still further increased if it should ever be requisite.

When the operator depresses a key, for instance the key A, the composer, which at that moment is over the arms $h^2$ of the key-board levers, is set to conform to the perforations in the ring F under the channel containing the types A, and, as the carrier-wheel revolves and said composer comes opposite the channel containing the types A, it falls in and scrapes the lowest type out of said channel. As the operation progresses, a number of types are thus deposited on the carrier-wheel, and, when a copy is finished, a large number of types still remain on the carrier-wheel, and these types have to be brought into the receiving-channel before the operation is completed.

This object is effected by means of a blank key, L*, (see figs. 3 and 4,) which is connected with the nib-slide $w^1$, so that it actuates said slide, and, consequently, the hammer $r^1$, moving at the same time all of the key-board levers.

By keeping the finger down on the key L*, therefore, the carrier-wheel is caused to move step by step as long as the pressure on said key continues, at the same time actuating all the indicators of the composers, so that all the types on the carrier-wheel are lifted up into the receiving-channel, while no fresh types are scraped out, because all the key-board levers are tilted and no regular set is given, and, consequently, the carrier-wheel will be emptied in a short time.

The blank key is made to actuate the key-board levers, so as to prevent either of them from assuming a wrong position, which would cause a derangement of the mechanism.

It must be remarked that the pressure on the key L must be yielding, since said key is raised up by the action of the restoring hook after each motion of the carrier-wheel.

Instead of the blank key L*, a starting-lever, Q, may be employed, (see figs. 4 and 10.)

This lever has its fulcrum on a column, $x^2$, which rises from the bed of the key-board, and it is provided at one end with a fork, $w^2$, which straddles the connecting-rod $v^1$ of the nib-slide, while its other end is furnished with a handle, and so arranged that it can be secured in notches in the side of the key-board.

The fork $w^2$ of this lever bears against a spring, $x^2$, coiled around the connecting-rod of the nib-slide, and, if the handle of the lever is turned in the direction of the arrow marked near it, in fig. 4, and then fastened in the appropriate notch in the edge of the key-board, a continuous yielding pressure is exerted on the rod $v^1$ on the nib-slide, and the carrier-wheel is caused to move step by step as long as this pressure continues.

The pressure exerted by the lever Q on the rod $v^1$ must be necessarily yielding to allow said rod to recede under the action of the carrier-wheel on the restoring-hook $x^1$.

This starting-lever does not actuate the key-board levers, and it can be used without danger if the key-board levers are not made, at the same time, to assume a wrong position.

The copy from which the operator works is secured in a copy-holder, R, of any suitable construction.

What I claim as new, and desire to secure by Letters Patent, is—

1. The arrangement of a receiving or composing-channel, O, on the surface of a cone, supporting a series of type-channels, substantially as described, so as to save room and avoid the necessity of changing the inclined position of the types while the same are being transferred from the type-wheel to the receiving-channel.

2. The combination of the perforated ring F with the type-channels, placed in an upright or inclined position, substantially as and for the purpose described.

3. The hinged radiating composers E, in combination with the carrier-wheel C, constructed and operating substantially as set forth.

4. The combination of a carrier-wheel, provided with composers, and having a step-by-step motion with type-channels having an inclined, horizontal, or upright position, substantially as and for the purpose described, 5. The arrangement of one or more ribs, $n\ o$, and one or more cavities, $m$, on the carrier-wheel C, substantially as and for the purpose set forth.

6. The scrapers $w$ on the ends of the composers, in combination with the indicators $p$, perforated ring F, and with the lip $h$ on the discharge-spouts of the type-channels, on the cone D, substantially as and for the purpose described.

7. The scalloped rim G, in combination with the composers, the perforated rim F, and the cone D, substantially as and for the purpose set forth.

8. The yielding or elastic side plate $i$, provided with a flange, $j$, on the discharge-spout of the type-channel, substantially as and for the purpose set forth.

9. The guide-pins or projections $v$ in the carrier-wheel, in combination with the composers E, substantially as and for the purpose set forth.

10. The lifter $s^2$, in combination with the recess $m$ in the rim of the carrier-wheel, substantially as and for the purpose described.

11. The retaining-hooks $k^2$ on the receiving-channel, in combination with the lifter $s^2$, and with the carrier-wheel, substantially as and for the purpose set forth.

12. The bell-crank levers $t^2$ and gong $u^2$, in combination with the multiple-channel P, substantially as and for the purpose set forth.

13. The combination of the nib-slide $w^1$ with the key-board levers, the keys, and the indicators of the composers, substantially as and for the purpose described.

14. The mechanism, substantially as herein described, for imparting to the carrier-wheel a step-by-step motion, consisting of a hammer, a series of loose pins inserted in the rim of the carrier-wheel, a stop, $n^1$, and a pawl capable of engaging with teeth in the rim of the carrier-wheel, as set forth.

15. The oscillating lever H, carrying on one end a pawl, $k^1$, capable of engaging with teeth on the rim of the carrier-wheel, and on its opposite end a cam, $q^2$, acting on the lifter of the receiving-channel, substantially as and for the purpose described.

16. The stop-pawl $y^1$, having a cam-shaped edge, in combination with the oscillating lever H and carrier-wheel C, substantially as and for the purpose set forth.

17. The restoring-hook $x^1$, in combination with the hammer $r^1$, and with the carrier-wheel C, substantially as and for the purpose described.

18. The combination of the restoring-hook $x^1$ with the nib-slide $w^1$, and with the keys L, substantially as and for the purpose set forth.

19. The mechanism, substantially as described, for stopping the keys, consisting of stop-latch $j^2$, nib-slide $w^1$, and key-board levers N, as specified.

20. The combination of a blank key, L*, with the nib-slide and key-board levers, and with the carrier-wheel, substantially as and for the purpose set forth.

21. The combination of the starting-lever Q with nib-slide and carrier-wheel, substantially as described.

22. The arrangement of keys L, vibrating upon one common fulcrum, $b^2$, in combination with guide-bars $e^2\ f^2$, as described.

This specification signed by me this 17th day of January, 1870.

JOHN T. SLINGERLAND.

Witnesses:
W. HAUFF,
R. SAUGMEISTER.